Figure 1:
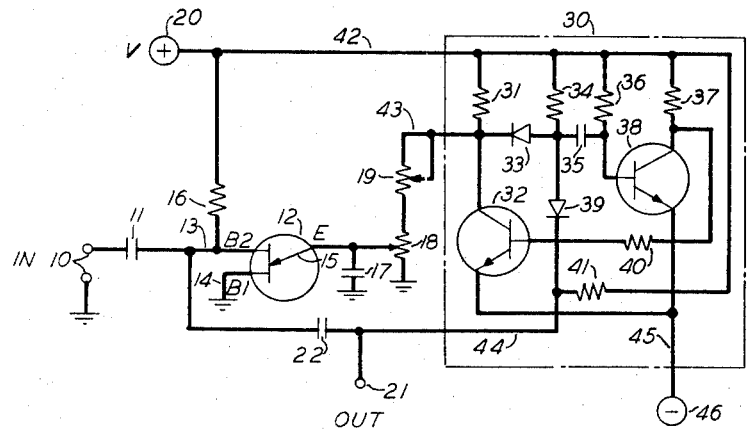

July 23, 1968

D. L. FAVIN 3,394,271

PULSE PRODUCING CIRCUIT FOR INDICATING THE
NEGATIVE-GOING ZERO CROSSING POINTS
OF AN APPLIED A.C. VOLTAGE

Filed Dec. 27, 1965

INVENTOR
D. L. FAVIN
BY
John K. Mullavney
ATTORNEY

United States Patent Office 3,394,271
Patented July 23, 1968

3,394,271
PULSE PRODUCING CIRCUIT FOR INDICATING THE NEGATIVE-GOING ZERO CROSSING POINTS OF AN APPLIED A.C. VOLTAGE
David L. Favin, Little Silver, N.J., assignor to Bell Telephone Laboratories, Incorporated, New York, N.Y., a corporation of New York
Filed Dec. 27, 1965, Ser. No. 516,532
10 Claims. (Cl. 307—235)

This invention relates to pulse producing circuits and more particularly it relates to circuits which produce output pulses at the instants in which an applied A.C. voltage passes through its zero crossing points.

In phase and delay measurements one technique of measuring the phase difference between two sinusoidal signals involves the derivation of pulses at the same fixed point of phase for each signal and a comparison of the pulse trains derived from each signal. In order to minimize the effect of amplitude changes in the signal the fixed point in phase at which a pulse is derived is generally chosen to be at one of the two points of inflection which occur during each cycle of the sinusoidal wave. These points of inflection are commonly known as the points of zero crossing, the term zero referring to the inflection point amplitude of a wave whose D.C. component is zero. In the past, pulses were derived at the zero crossings by differentiating the quasi rectangular signal which results from amplifying and amplitude limiting the sinusoid. With finite amplification the time at which the pulse occurs using the latter method is still dependent to a degree on the amplitude of the sinusoidal wave.

One circuit for producing output pulses at the negative-going zero crossing of an applied A.C. voltage which is less sensitive to the amplitude of the A.C. voltage can be found in my copending application Ser. No. 417,277, filed Dec. 10, 1964, and now Patent No. 3,296,554. This earlier pulse producing circuit consists of a unijunction transistor relaxation oscillator which is synchronized by an applied sinusoidal signal superimposed on the base-to-base voltage of the unijunction transistor. A resistance-reactor combination in the emitter circuit is adjusted so that the oscillator's unsynchronized pulse repetition period is equal to the period (reciprocal of frequency) of the applied sinusoid. As a result the pulses which occur during conduction of the unijunction transistor are forced to occur in synchronism with the negative-going zero crossing of the applied sinusoidal signal. Even in this improved type of zero crossing detector, however, the greatest accuracy can be obtained by using as large an amplitude as possible for the applied sinusoidal voltage. A limitation in my earlier circuit, as pointed out in my above-identified copending application, is that a significant voltage exists on the emitter at the time when the applied sinusoid on the base electrode passes through its negative peak. The amplitude of the applied sinusoidal voltage is therefore limited in my earlier circuit by the fact that the negative peak is not permitted to lower the potential on the base to a point at which the existing potential on the emitter would cause the unijunction transistor to conduct.

It is therefore one object of this invention to provide a zero crossing detector which utilizes a unijunction transistor and which permits the application of a larger amplitude sinusoidal voltage, and therefore results in greater accuracy, than was heretofore possible.

Another object of this invention is to provide a zero-crossing detector whose accuracy does not so directly depend on the accuracy of the time constant of a resistor-reactor circuit.

These and other objects are achieved in accordance with the instant invention wherein an applied sinusoidal voltage is superimposed on the D.C. potential between the first and second base electrodes of a unijunction transistor and the emitter electrode is normally provided with a potential with respect to the first base which will allow the transistor to conduct for all applied sinusoidal potentials which are zero or negative. In addition, a monostable means, in response to an output pulse which appears on the second base electrode upon conduction of the transistor, clamps the emitter electrode to a potential which will ensure the emitter electrode remains back-biased for a predetermined interval of time, at least as long as the negative portion of the applied sinusoidal voltage. After the predetermined interval of time, the emitter is permitted to return to its normal potential. Thus, pulses are produced at, and only at, the negative-going zero crossing points, and a larger sinusoidal voltage than was heretofore possible can be applied without forward-biasing the emitter junction during the negative peak of the sinusoid.

Figure 2:
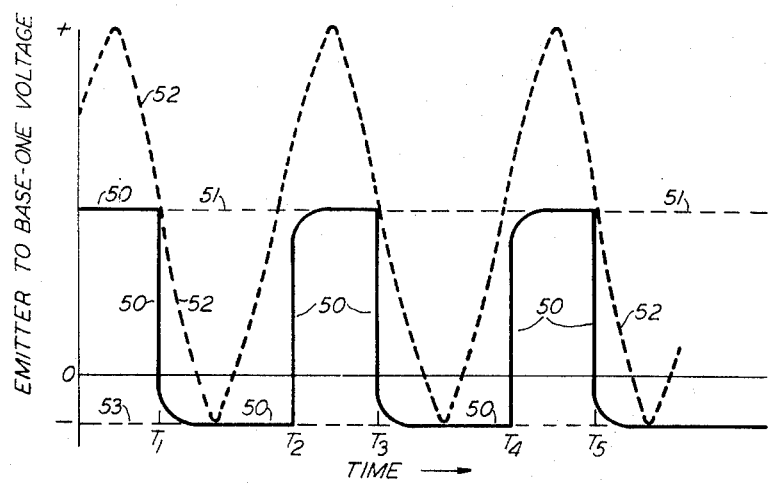

The objects and advantages of the invention will be more clearly understood from a consideration of the following detailed description in connection with the attached drawings in which:

FIG. 1 is a schematic diagram of one embodiment constructed in accordance with the invention; and FIG. 2 is a plot of the emitter-to-base-one voltage of the unijunction transistor versus time, useful in connection with the explanation of the invention.

Referring now to FIG. 1 of the drawings, the portion of the circuit shown within dotted enclosure 30 is similar to a standard monostable multivibrator disclosed in FIGS. 18-35 of Pulse and Digital Circuits by Millman and Taub, McGraw-Hill Book Company, Inc., 1956. This monostable multivibrator is not a significant part of the invention and may be replaced by any other monostable means which provides a high positive potential on line 43 during its stable state and negative or reference potential on line 43 for a predetermined interval after a negative impulse is provided to the monostable circuit on line 44. However, for the sake of completeness, the monostable multivibrator within dotted enclosure 30 will be briefly described.

Positive potential source 20 is connected to monostable multivibrator 30 by way of line 42. When monostable multivibrator 30 is in its stable or equilibrium state, that is, when no negative impulses are supplied to the multivibrator by way of line 44, transistor 38 is ON, that is to say in conduction, by virtue of the positive potential applied to its base through resistor 36. With transistor 38 in conduction and its emitter connected via line 45 to negative potential source 46, the collector of transistor 38 is maintained at a potential substantially equal to that of negative potential source 46. Transistor 32 on the other hand is normally held OFF, that is to say out of conduction, by virtue of the fact that its base is held at substantially the same potential as that found on its emitter by connection of the base through resistor 40 to the collector of transistor 38. The collector of transistor 32 is normally at a high positive potential, reduced from that of potential source 20 solely by the current which flows out of line 43 into the circuit to which multivibrator 30 is connected. The junction of the anode of diode 33 and one plate of capacitor 35 is connected through resistor 34 to line 42 and is held at a potential substantially equal to the potential on collector 32 by virtue of forward-biased diode 33. The other plate of capacitor 35, connected to the base of transistor 38, is substantially at the negative potential of source 46 by virtue of the base to emitter conduction through transistor 38. Diode 39 is normally back-biased since its cathode is connected through resistor 41 to positive potential source 20 via line 42, and its anode is connected to the junction of diode 33 and resistor 34. As indicated above, the potential at this junction is reduced from that of positive potential source 20.

With the application of a negative impulse on line 44, diode 39 is caused to conduct and rapidly reduce the potential at the junction of the anode of diode 33 and one plate of capacitor 35. The charge on capacitor 35 is unable to change instantaneously, and therefore the negative impulse at the junction of diode 33 and capacitor 35 is transmitted to the other plate of capacitor 35 causing the base-emitter junction of transistor 38 to be rapidly back-biased. Transistor 38 is consequently turned OFF, that is, out of conduction, and the collector of transistor 38 is permitted to rapidly rise toward the positive potential on line 42 which in turn transmits a positive potential by way of resistor 40 to the base of transistor 32. This causes transistor 32 to turn ON and rapidly reduce the potential at its collector, and hence on line 43, to a potential substantially equal to the negative potential of source 46. At this point diode 33 clamps said one plate of capacitor 35 to the negative potential whether or not the initial negative impulse on line 44 was sufficient to drive the one plate of capacitor 35 to this low a level. Accordingly, the base of transistor 38 is back-biased by an equal amount during each operation of the multivibrator irrespective of the magnitude of the initial negative pulse on line 44.

Capacitor 35 then charges through resistor 36 thereby raising the base of transistor 38 toward the potential on line 42 at a rate which is primarily determined by the time constant of resistor 36 and capacitor 35. After a predetermined interval of time, the base of transistor 38 reaches a sufficiently positive potential with respect to its emitter to cause transistor 38 to go back into conduction thereby rapidly clamping its collector to the negative potential of source 46. By virtue of the connection through resistor 40, the base of transistor 32 is also clamped to this negative potential causing transistor 32 to turn OFF, thereby allowing its collector to return to the same potential which existed during the stable state. In summary, a negative impulse on line 44 causes monostable multivibrator 30 to clamp line 43 to a potential substantially equal to the potential of source 46 for a predetermined interval of time.

Referring now to that portion of FIG. 1 which is outside of the dotted enclosure 30, a conventional so-called unijunction transistor device 12 is shown which, as is well understood in the art, comprises a body of one type of semiconductor material such as n-type material. A pair of bilaterally conductive ohmic contacts are joined to opposite ends of the body in spaced relationship to one another, consisting of base-one contact 14 and base-two contact 13. Joined to the body, intermediate contact 13 and 14, is a rectifying contact or emitter 15, such as a dot of p-type material. Positive potential source 20, having its negative side connected to a point of reference potential, supplies a positive potential to base-two contact 13 through resistor 16. A potential gradiant is thereby established within the body of device 12 between base-two 13 and base-one 14, the latter being connected to a point of reference potential.

For a unijunction transistor of the type shown in FIG. 1, when a potential is applied to the emitter which is less positive than the potential established within the body in the region of the emitter, the rectifying contact is reverse biased and very little current will flow. On the other hand, when the potential applied to the emitter is sufficiently positive with respect to the potential established within the body so as to forward-bias the rectifying contact, current will easily flow into emitter 15 toward base-one 14, thereby changing the potential gradiant and causing the unijunction transistor to go into conduction, during which an increased current flows into base-two 13 and the potential on base-two rapidly changes toward the base-one potential. The potential between the emitter and base-one at which the rectifying contact will be forward-biased is equal to a fixed percentage of the potential between base-two and base-one.

As indicated above, a potential gradient is established within the body of unijunction transistor 12 by connecting base-two 13 through resistor 16 to positive potential source 20. Superimposed on this D.C. potential from base-two to base-one is the A.C. voltage connected to input terminals 10 and coupled to base-two 13 by way of coupling capacitor 11. Emitter electrode 15 is connected to the arm of potentiometer 18 which, in series with variable resistance 19, forms a potential divider from line 43 to reference potential. Capacitor 17 is connected between emitter electrode 15 and reference potential for a purpose to be described hereinbelow after a discussion of the operation of the remainder of the circuit.

As described hereinabove in connection with the operational description of monostable multivibrator 30, transistor 32 during the stable state is out of conduction and therefore does not draw any appreciable current through resistance 31. The potential on the arm of potentiometer 18 is therefore determined during the stable state solely by the current which flows from potential source 20, through resistance 31, through variable resistance 19 and potentiometer 18 to reference potential. Assume for the moment that no A.C. voltage is applied to input terminal 10 and therefore no A.C. voltage is superimposed on the D.C. potential between the base-two and base-one electrodes. Under those conditions if emitter electrode 15 is provided with a potential which is sufficiently positive so as to cause unijunction transistor 12 to conduct, a rapid drop in potential will occur at base-two 13 and be coupled by way of coupling capacitor 22 through to output terminal 21 and to line 44 of monostable multivibrator 30. As described hereinabove a negative pulse on line 44 causes monostable multivibrator 30 to enter its unstable state during which line 43 is clamped to a potential substantially equal to the negative potential of source 46. This clamping, of course, removes the positive potential from emitter electrode 15 and provides it with a potential which is insufficient to maintain unijunction transistor 12 in a state of conduction. Unijunction transistor 12 therefore rapidly returns to its OFF state, that is to say, out of conduction. After a predetermined interval of time primarily established by the time constant of capacitor 35 and resistance 36, line 43 is returned to its highly positive potential and unijunction transistor 12 will again conduct and produce a sharp negative pulse at base-two electrode 13 thereby repeating the cycle and in so doing causing a train of pulses to appear at output terminal 21.

Potentiometer 18 and variable resistance 19 are adjusted so that emitter electrode 15 is provided with a very specific potential. More particularly, electrode 15 is provided with a positive potential such that unijunction transistor 12 will conduct when supplied with the D.C. potential from positive potential source 20 through resistor 16, but will not conduct if potentials applied to base-two electrode 13 are in excess of this D.C. potential supplied through resistor 16. Assuming that potentiometer 18 is a coarse adjustment and variable resistance 19 is a fine adjustment on the potential delivered to emitter electrode 15, the adjustment of the resistances to achieve this rather specific potential is made without any A.C. voltage applied to input terminals 10 in the following manner. The arm on potentiometer 18 is decreased toward reference potential until the pulses at output terminal 21 described hereinabove cease to exist. Variable resistance 19 is then slowly decreased in value and stopped at the point where the pulses at output terminal 21 commence.

After the correct potential on emitter electrode 15 is obtained, a sinusoidal voltage is applied to input terminal 10 and coupled by way of coupling capacitor 11 so as to be superimposed on the D.C. potential between base-two electrode 13 and base-one electrode 14. As described hereinabove, monostable multivibrator 30 is adjusted so as to provide a clamp to the negative potential on line 43 for a predetermined interval of time after a negative impulse is presented to multivibrator 30 on line 44. This predetermined interval is advantageously set to be in excess of the negative portion of the sinusoidal voltage applied to input terminals 10. Referring now to FIG. 2 a plot of emitter to base-one voltage versus time is shown as curve 50. Also shown in FIG. 2 is voltage level 51, the emitter to base-one voltage at which unijunction transistor 12 will conduct when only the voltage from potential source 20 is supplied to base-two electrode 13 through resistor 16. Voltage level 51 is the above-described precise potential to which emitter electrode 15 is adjusted by means of potentiometer 18 and variable resistance 19. Also shown in FIG. 2 is a dotted sinusoidal curve 52 which indicates the potential which the emitter to base-one voltage must equal or exceed at any given instant in order to cause unijunction transistor 12 to go into conduction. This sinusoidal voltage level requirement indicated by curve 52 is brought about by the fact that a sinusoidal voltage has been superimposed on the base-two to base-one D.C. potential and by the property of unijunction transistors that a fixed percentage of the potential applied to the bases must be applied to the emitter electrodes in order to cause the unijunction transistor to conduct. Accordingly, curve 52 is simply a fixed percentage of the applied sinusoidal voltage at input terminals 10 superimposed on voltage level 51.

Since the time during which monostable multivibrator 30 is in its unstable state is advantageously set to be in excess of one half cycle of the applied sinusoidal voltage, irrespective of the initial phase of the applied sinusoidal voltage we will either initially, or after several cycles of circuit oscillations, arrive at a point in time at which the sinusoidal voltage is in its positive half cycle and emitter electrode 15 has been returned to voltage level 51. This point in time is indicated in FIG. 2 as time $t=0$. Unijunction transistor 12 can of course not conduct at this point since the voltage on the base-two electrode is in excess of the normal D.C. potential supplied through resistor 16. At $t=T_1$ the applied sinusoidal voltage passes through its inflection point called the negative-going zero crossing bringing the voltage on base-two electrode 13 to a level at which unijunction transistor 12 will conduct as indicated in FIG. 2 by the intersection of curve 52 with curve 50 which is, waiting in a sense, at voltage level 51. When unijunction transistor 12 conducts, a substantial amount of current flows through resistor 16 thereby causing a sharp negative drop on base-two electrode 13 which in turn is transmitted by capacitor 22 to output terminal 21 and line 44 of monostable multivibrator 30. This negative impulse at $t=T_1$ causes monostable multivibrator 30 to clamp line 43 to the negative potential of source 46 and in turn to clamp emitter electrode 15 to a negative potential as indicated in FIG. 2 by voltage level 53. Since the reduced potential on the emitter electrode caused by the clamping of line 43 to source 46 is insufficient to maintain unijunction transistor 12 in conduction, base-two 13 rapidly returns to its high potential level, thereby forming the end of the negative pulse.

Voltage level 53 can be raised or lowered in potential by changing the potential of source 46. Level 53 need only be sufficiently negative with respect to level 51 such that it is more negative in potential than the negative peak of curve 52. If sufficient accuracy can be obtained by an A.C. voltage whose negative peak on curve 52 does not go as low as zero volts, source 46 can have a potential of zero volts, that is, line 45 may be connected to reference potential.

During the time interval $t=T_1$ to $t=T_2$ shown in FIG. 2, monostable multivibrator 30 continues to clamp line 43 to the negative potential of source 46. During this time interval, that is from $T_1$ to $T_2$, the applied sinusoidal voltage passes through its negative half cycle and through its other inflection point, that is, the positive-going zero crossing, and proceds into its positive half cycle. Hence at time $t=T_2$ when monostable multivibrator 30 permits line 43 to return to a high positive potential, the applied sinusoidal voltage from input terminal 10 has already entered the positive half of its cycle, and therefore the voltage on base-two electrode 13 is in excess of the potential at which unijunction transistor 12 is permitted to go into conduction. Hence the circuit will remain idle during the interval in FIG. 2 from $t=T_2$ to $t=T_3$ until once again the applied sinusoidal voltage decreases from its positive potential to the negative-going zero crossing and the potential on base-two electrode 13 is such that unijunction transistor 12 is driven into conduction. The firing of unijunction transistor 12 into conduction at $t=T_3$ once again transmits a negative impulse to line 44 by way of coupling capacitor 22 causing monostable multivibrator 30 to clamp emitter electrode 15 to negative potential level 53 for the predetermined time interval shown in FIG. 2 from $T_3$ to $T_4$. Since this interval, as described hereinbefore, is in excess of the one half cycle of the applied sinusoidal voltage, the emitter electrode 15 will again return to voltage level 51 at time $t=T_4$ when the applied sinusoidal voltage has again entered the positive half of its cycle.

Capacitor 22, unlike capacitor 11, should not pass an appreciable portion of the applied sinusoidal voltage in order to avoid triggering the monostable multivibrator 30 by the negative half cycle of the applied sinusoidal voltage. Capacitor 22 should, however, pass the negative impulse to line 44 of monostable multivibrator 30. Accordingly, the capacitance of capacitor 22 should be advantageously selected to be lower in value than that of capacitor 11.

Only a small drop in potential at base-two electrode 13 is necessary in order to cause monostable multivibrator 30 to operate and rapidly clamp line 43 to the negative potential of source 46. This clamping action occurs so rapidly that if capacitor 17 is not present in the circuit, unijunction transistor 12 will be taken out of conduction substantially instantaneously with the small drop at base-two electrode 13, thereby forming the end of the negative pulse on the latter electrode. Accordingly, the negative pulse at output terminal 21 which indicates the instant of negative-going zero crossing will not be very large. On the other hand, if capacitor 17 is advantageously connected as shown in FIG. 1 between emitter electrode 15 and reference potential, emitter electrode 15 is supplied by the discharge current from capacitor 17 which causes a much larger drop to occur at base-two electrode 13 before unijunction transistor 12 goes out of conduction. Consequently, a larger negative pulse is delivered to output terminal 21 at the instant of negative-going zero crossing.

The value of capacitor 17 should not be so large as to provide a substantial time constant in connection with the impedance provided by potentiometer 18, variable resistance 19 and resistor 31. The effect of capacitor 17 can be seen in curve 50 of FIG. 2 by the slightly delayed return of curve 50 to voltage level 51 at the times $t=T_2$ and $t=T_4$. This time constant, established by capacitor 17 and its associated impedance, should be maintained sufficiently small so that cruve 50 is permitted to substantially return to voltage level 51 at the instants corresponding to times $T_1$, $T_3$ and $T_5$, that is, at the instants when the applied sinusoidal voltage passes through its negative-going zero crossing. Otherwise, perturbations in the time constant will cause inaccuracies in the indicated instants of zero crossing.

Although a time constant circuit, consisting of capacitor 35 and resistor 36, is required for the operation of the instant zero crossing detector, the accuracy requirement on this charging circuit is extremely lenient. This R–C circuit determines the time interval during which monostable multivibrator 30 remains in its unstable state and need only provide an unstable interval which is greater than one half cycle of the applied sinusoidal voltage and sufficiently less than a full cycle of the applied sinusoidal voltage so as to permit curve 50 to return to a potential substantially equal to voltage level 51 before the next negative-going zero crossing of the applied sinusoidal voltage. Unlike the zero-crossing detector in my above-mentioned copending application, the emitter electrode potential in the instant invention does not begin to charge at times $t=T_1$, $T_3$ and $T_5$, and therefore the applied sinusoidal voltage can have a larger peak-to-peak amplitude since the negative portion of the applied sinusoid may drop to a lower potential without reaching a potential at which unijunction transistor 12 will conduct. A large peak-to-peak applied sinusoidal voltage passes through its negative-going zero crossing with a greater slope than does a smaller sinusoid. Accordingly, the accuracy with which the circuit will produce output pulses which indicate the instants at which the negative-going zero crossing occurs, is greatly enhanced.

Although the invention has been described in connection with a monostable multivibrator which provides a negative potential on line 43 during its unstable predetermined interval, the invention can also be practiced with an advantage over the circuit in my above-identified earlier application by using a monostable multivibrator which clamps line 43 to reference potential for the predetermined interval. Even in this case, the instant circuit has a significantly lower potential on the emitter electrode at the instant during which the applied sinusoidal voltage passes through its negative peak. A clamp on line 43 to reference potential for the predetermined unstable interval can easily be achieved in the circuit of FIG. 1 by connecting line 45 to reference potential rather than to minus potential source 46.

What has ben described hereinbefore is a specific illustrative embodiment of the present invention. It is to be understood that numerous other arrangements of physical parts and different components may be utilized with equal advantage. For example, other types of monostable means can be substituted for monostable multivibrator 30. In addition, the type of unijunction transistor semiconductor materials may be changed with a corresponding change in the polarity of the voltage source and monostable means. The invention is also in no way limited to synchronizing signals having a purely sinusoidal wave form since the invention can be advantageously utilized with any wave form having a negative-going region, for example, a triangular wave form.

Accordingly, it is to be understood that the above-described arrangement is merely illustrative of the application of the principles of the present invention and numerous modifications thereof may be devised by those skilled in the art without departing from the spirit and scope of the invention.

What is claimed is:

1. A circuit for producing an output pulse when an applied A.C. voltage passes through its negative-going zero crossing comprising a unijunction transistor having a first base, a second base, and emitter electrodes, means for applying a D.C. potential between said first base electrode and said second base electrode, means for superimposing the applied A.C. voltage on said D.C. potential between said base electrodes, monostable means connected to said emitter electrode for applying thereto a first voltage level during its stable state and a second voltage level for a predetermined interval after a voltage pulse is delivered to its input, said predetermined interval being at least as long as the negative portion of said applied A.C. voltage, said first voltage level being of a value such as to allow said transistor to conduct when said applied A.C. voltage is zero and to thereby produce a voltage pulse at said second base electrode, and means connecting the voltage pulse at said second base to an output terminal and to the input of said monostable means, said second voltage level being of a value such as to back-bias said transistor for the predetermined interval.

2. A circuit as defined in claim 1 wherein said monostable means includes a monostable multivibrator which provides a substantially rectangular wave at its output in response to the voltage pulse at said output terminal.

3. A circuit as defined in claim 2 wherein said monostable means further includes a potentiometer means having two ends and an arm, one of said two ends being connected to the output of said monostable multivibrator, the other of said two ends being connected to a reference potential, and the arm of said potentiometer means being connected to said emitter electrode.

4. A circuit as defined in claim 3 wherein said monostable means further includes a capacitor having one end connected to the arm of said potentiometer means and the other end connected to said reference potential, said capacitor being of sufficient capacity so that its discharge through the transistor during conduction causes an increase in the magnitude of the output pulse at said output terminal.

5. A circuit as defined in claim 2 wherein said means connecting the voltage pulse to said output terminal is a capacitor with sufficient reactance so as to substantially reduce the amount of the applied A.C. voltage which is coupled to said output terminal.

6. A circuit for producing an output pulse when an applied A.C. voltage passes through its negative-going zero crossing comprising a unijunction transistor having a first base, a second base, and emitter electrodes, means connecting said first base electrode to a reference potential, impedance means for applying a D.C. potential to said second base electrode, means for superimposing said applied A.C. voltage on said D.C. potential applied to said second base electrode, monostable means connected to said emitter electrode for applying thereto during its stable state a first voltage level of a value such as to allow said transistor to conduct when said applied A.C. voltage is zero and to thereby produce a voltage pulse at said second base electrode, and means connecting said voltage pulse to said monostable means, said monostable means operative in response to said voltage pulse for clamping said emitter electrode for a predetermined interval at least as long as the negative portion of said applied A.C. voltage to a second voltage level which back-biases said unijunction transistor for all values of the applied A.C. voltage during said predetermined interval.

7. A circuit as defined in claim 6 wherein said monostable means includes a monostable multivibrator having an output which provides a potential greater than said first voltage level except for the predetermined interval during which its output provides a potential opposite in polarity to that of said first voltage level.

8. A circuit as defined in claim 7 wherein said monostable means further includes a potentiometer means having two ends and an arm, one of said two ends being connected to the output of said monostable multivibrator, the other of said two ends being connected to reference potential and the arm of said potentiometer means being connected to said emitter electrode.

9. A circuit as defined in claim 8 wherein said monostable means further includes a capacitor having one plate connected to the arm of said potentiometer and its other plate connected to reference potential, said capacitor being of sufficient capacity so that its discharge through the transistor during conduction causes an increase in the voltage pulse at said second base electrode.

10. A circuit as defined in claim 6 wherein said means connecting said voltage pulse to said monostable means is a capacitor with sufficient reactance so as to substantially reduce the magnitude of A.C. voltage which is coupled to said monostable means.

No references cited.

ARTHUR GAUSS, *Primary Examiner.*

J. ZAZWORSKY, *Examiner.*